May 23, 1961    H. HOCH ET AL    2,985,587
METHOD OF AND APPARATUS FOR DIALYSIS
Filed Jan. 10, 1958    3 Sheets-Sheet 1

INVENTORS:
Hans Hoch and
Ray C. Williams,
BY
ATTORNEY

May 23, 1961  H. HOCH ET AL  2,985,587
METHOD OF AND APPARATUS FOR DIALYSIS
Filed Jan. 10, 1958  3 Sheets-Sheet 2

INVENTORS.
Hans Hoch and
Ray C. Williams
BY
ATTORNEY.

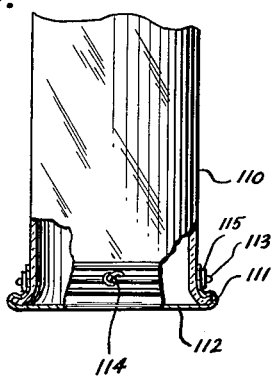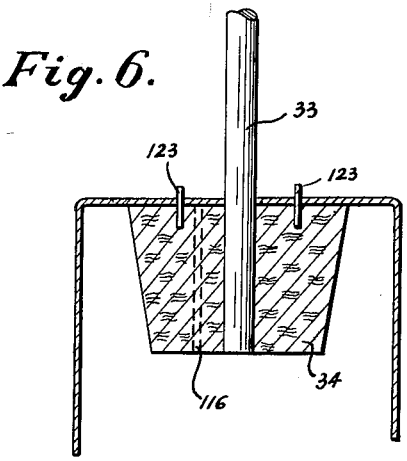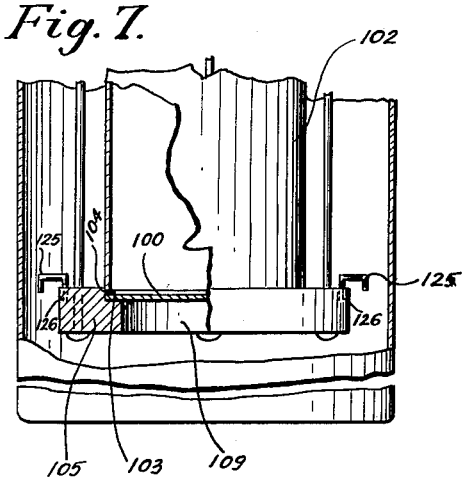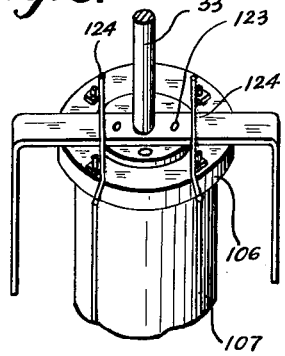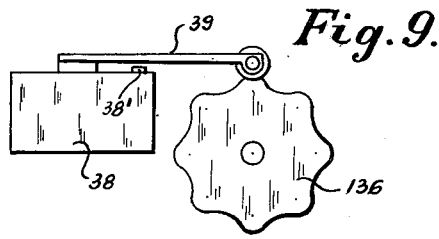

United States Patent Office 2,985,587
Patented May 23, 1961

2,985,587
METHOD OF AND APPARATUS FOR DIALYSIS
Hans Hoch and Ray C. Williams, Richmond, Va., assignors to Medical College of Virginia Foundation, Inc., Richmond, Va., a corporation of Virginia
Filed Jan. 10, 1958, Ser. No. 708,288
17 Claims. (Cl. 210—22)

This invention relates in general to dialysis, and in particular, to a method and apparatus for the separation of solutes by means of their unequal diffusion through membranes, particularly for purposes of analysis, and to correlated improvement designed to extend the uses of such apparatus to separation of small molecules and purification of biological substances.

The method and apparatus which are the subjects of this invention find particular utility (a) in the rapid removal of dialyzable material from liquid solutions, especially in instances where micro-quantities are encountered, (b) in the obtaining of data for comparison of escape rates which yield information relative to the size of particles, (c) in the obtaining of data on changes in escape rate coefficients which data are used as an indication of size heterogeneity of a material which is dialyzed, (d) in the obtaining of data which enable plotting escape rate curves which serve as a means of characterizing distribution of particle sizes, (e) in the testing of homogeneity of chemical and pharmaceutical products, (f) in various research techniques for detecting heterogeneity, and (g) in the testing of porosity of membranes.

Dialyzing membranes are structures which when interposed between two bodies of liquid prevent their gross intermixture, but permit the passage of at least one of several solutes from one body of liquid to another. Prior dialyzers employing such membranes have been proposed, but those dialyzers have had certain limitations in that they either provided no means for stirring the solution to be dialyzed, provided a means for stirring which necessitated the insertion of a stirrer into the solution to be dialyzed, or incorporated a system which necessitated the use of elaborate circulating equipment.

Accordingly, it is a general object of the present invention to provide a method of dialysis which incorporates an efficient stirring procedure but which eliminates the need for insertion of a stirrer into the solution to be dialyzed and the need for elaborate circulating equipment.

It is a further general object of this invention to provide apparatus for dialysis which has great utility in the laboratory and which incorporates an analytical method for separating molecules.

It is a still further general object of the present invention to provide a dialysis apparatus which is easy to construct and to clean, and in which broken membranes may be easily replaced.

It is a specific object of the present invention to provide a method of dialysis in which concentration gradients which tend to develop at the membrane surfaces are substantially eliminated at predetermined regular intervals of time.

Another specific object of the present invention is to provide an apparatus for dialyzing which apparatus incorporates means for substantially eliminating the appearance of concentration gradients at membrane surfaces, said means being operable automatically at predetermined intervals of time.

Still another and more specific object of this invention is to provide a dialysis apparatus comprising containing means having walls for holding a solution wherein at least a part of one wall of said containing means is a membrane, supporting means for rotatably supporting the containing means, and means for periodically angularly displacing said supporting means and thereby said membrane at a rate which produces a shear or shears in a solution in contact with said membrane whereby any concentration gradients appearing at the membrane surfaces are effectively eliminated.

Yet another and still more specific object of the present invention is to provide an apparatus in accordance with the above objects, which apparatus may be used for a plurality of simultaneous dialyzations.

According to the present invention, there is provided a method of dialyzing a solution in contact with a dialyzing membrane which method comprises surrounding the outer surface of the membrane with a diffusate, and periodically revolving the membrane about its longitudinal axis at a rate which produces a shear in the solutions in contact with the membrane. There is also provided in an apparatus for the dialysis of the liquid solution in contact with a membrane, the combination of means for rotatably supporting the membrane and means for periodically rotating the supporting means at a rate which produces a shear in the solutions in contact with the membranes each time the supporting means is rotated.

According to usage in the art, in the following specification and appended claims, the term "diffusate" will be used to designate the receiving liquid fluid, that is, the fluid to contain or containing the material which will be, or has, diffused through the membrane during "dialysis"; and the term "dialysis" will be used to designate the diffusion of at least one soluble substance through a membrane from one liquid into another. The term "shear" is used to designate the passage of at least one layer of a fluid over another.

For a more complete understanding of the nature, objects, and scope of the present invention, reference should be had to the accompanying drawings wherein:

Figure 5 is a side view, partially in section, of another form of membrane and parts associated therewith which may be used in accordance with the provisions of this invention;

Figure 6 is a fragmental detail side view of part of a supporting means, stirring means and closure means used in the preferred form of apparatus provided by this invention;

Figure 7 is a fragmental side view, partially in section, showing the disposition of the membrane in relation to various parts of the dialysis apparatus provided by this invention when all parts are in operative position;

Figure 8 is a fragmental elevational view of parts of the containing means, supporting means and stirring means provided according to the preferred embodiment of this invention, for use in the subject apparatus and for use in carrying out the subject method; and Figure 9 is a detailed view showing a modified timing means provided by this invention for use in the subject apparatus.

Figure 1:
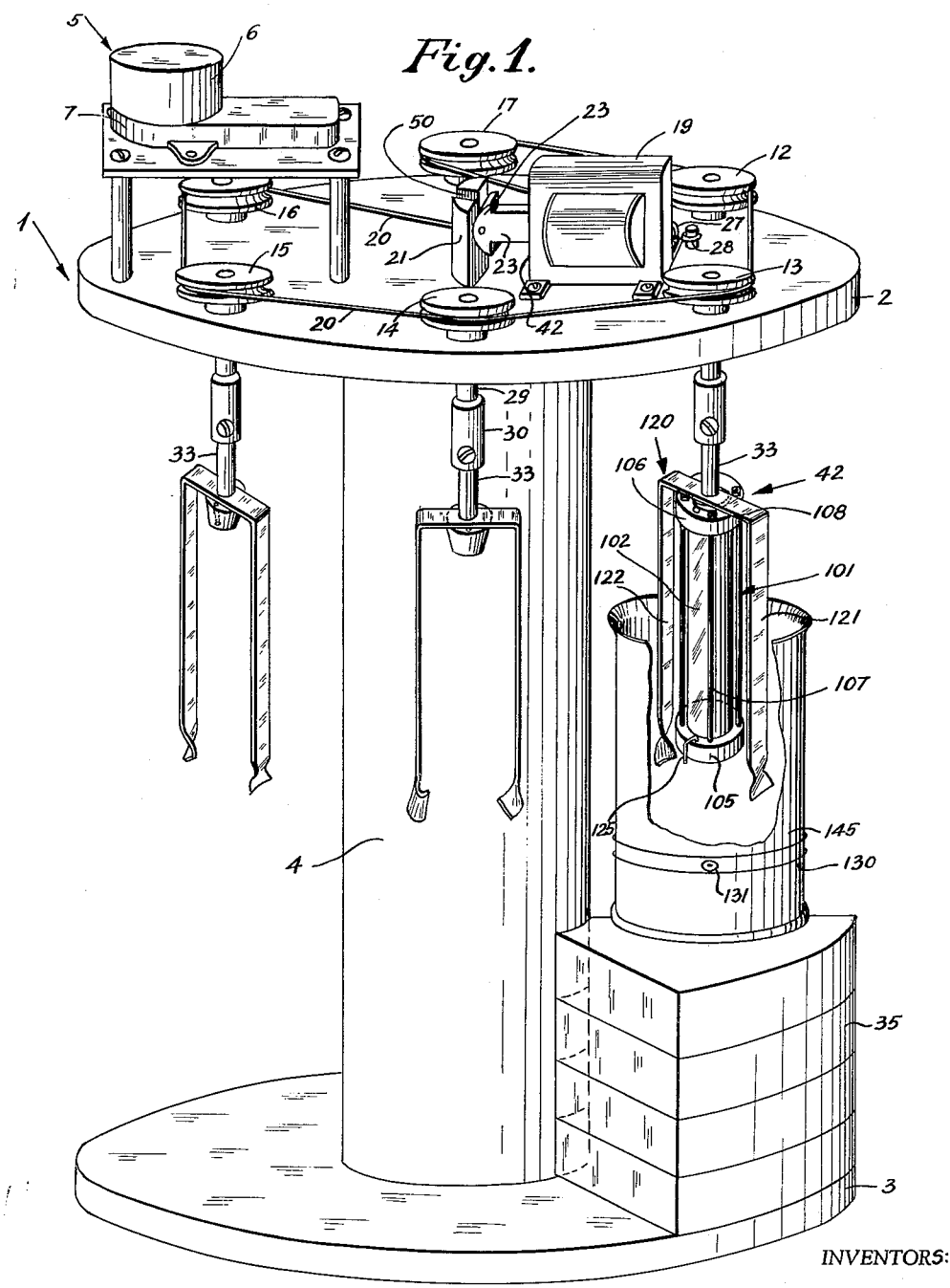
Figure 1 represents a side elevation of the preferred form of apparatus of this invention.

In the apparatus of the invention the numeral 1 designates the apparatus frame in general, the numeral 2 a top plate member of the frame, the numeral 3 a bottom plate member of the frame, and the numeral 4 a post which separates plate 2 from plate 3 and connects the same. The plates may be connected to the post by any suitable means such as by a weld. Resting on plate 3 is a support block 35. It should be understood that the frame need not be as shown. It may be of any design, which provides a support for the various means hereinafter referred to.

Figure 4:
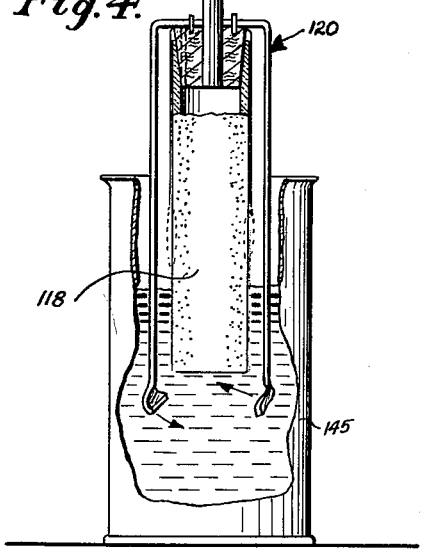
Figure 4 is a detailed view, partly elevational and partly sectional, of one form of membrane and parts associated therewith in accordance with the provisions of this invention.

Referring to Figure 4, the numeral 42 designates generally a rotatably mounted supporting means. In the preferred embodiment, a rotatable member, hereinafter referred to as pulley 18, which is part of a rotating means, is disposed on top of plate 2. A shaft 29 extends through an aperture in top plate 2, the aperture having a bearing 45 disposed therein. The pulley has a suitably-formed aperture for receiving shaft 29 which carries a collar 30. Collar 30 has a threaded aperture on its outer surface which receives screw 31, and also has a suitably-formed aperture centrally disposed along its longitudinal axis for receiving shaft 33. Screw 31 is tightened to hold shaft 33 in position. Although Figure 4 shows the use of supporting means 42 with one particular type of containing means which may be used in accordance with this invention, the supporting means shown in Figure 4 may be used with any type of membrane and containing means associated therewith as will become apparent hereinafter. Of course, pulley 18 may be any one of pulleys 12–17 of Fig. 1.

The numeral 41 designates generally a rotating means. This rotating means may be of any suitable design; however, the preferred embodiment is shown most clearly in Figure 2. The rotating means consists of a plurality of pulleys 12, 13, 14, 15, 16 and 17, connecting means 20, displacing means 19 and return means 27.

The connecting means 20 as shown is a cord attached to or frictionally engaging the periphery of each pulley. However, if desired, the cord 20 may be wrapped once around the periphery of each pulley. In fact, any connecting means may be used, as for example, a plurality of short rigid bars extending between points near the periphery of each pulley, the displacing means 19 and return means 27. In any case, the connecting means may be eccentrically attached to each of the pulleys 12–17.

Figure 2:
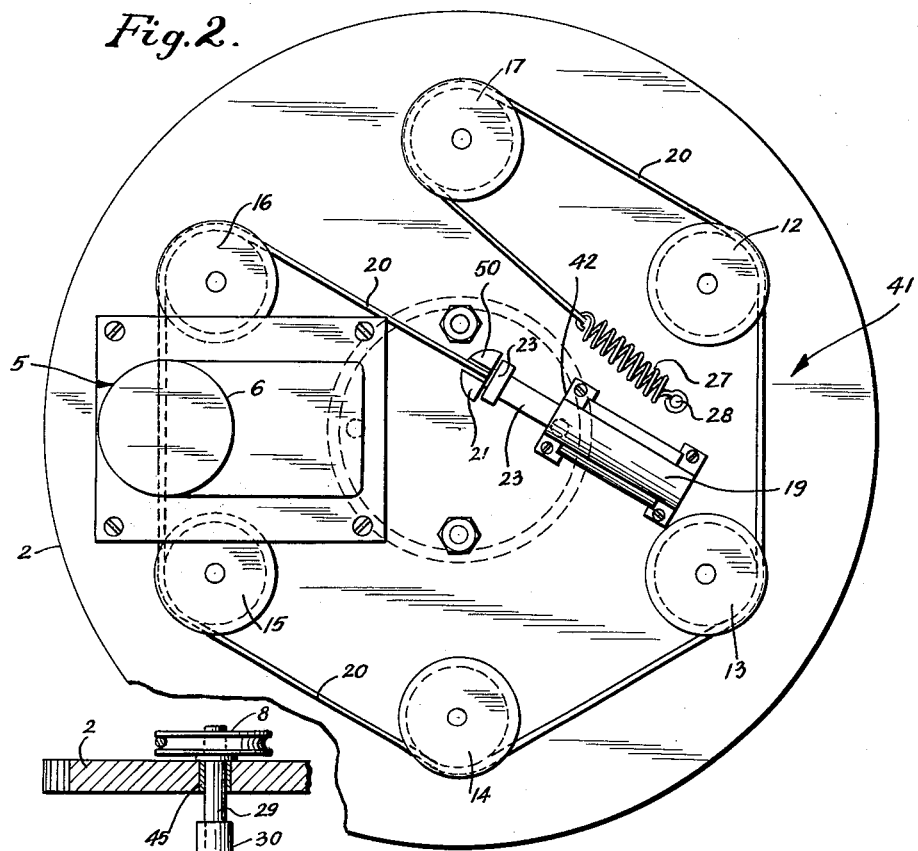
Figure 2 is a top plan view of the apparatus of the invention.

The displacing means 19 is an electrically-operated solenoid of any of the well-known types which incorporate a movable member. In Figure 2, plunger 23 is the movable member, and has a head portion $23^1$ to which is coupled one end of connecting means 20.

The return means 27 as shown in Figure 2 consists of a spring. One end of the spring is attached to the end of connecting means 20, and the other end is attached to a stationary post 28 carried on plate 2. It should be understood, though, that the return means is not limited to a spring. It may be any means which performs the same function as spring 27.

The numeral 21 designates a stop member which is rigidly secured to plate 2 by any suitable means, such as by a weld, and which serves to limit the travel of plunger 23. Stop member 21 is provided with a slot 50 through which connecting means 20 extends so as to attach to plunger 23.

Figure 3:
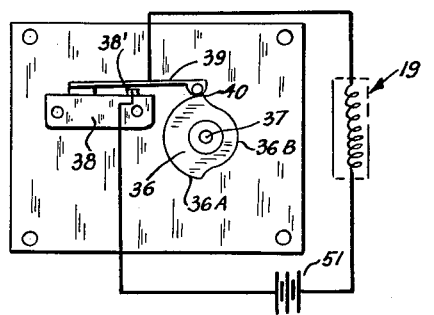
Figure 3 is a detailed view showing a timing means which is incorporated in the preferred form of apparatus.

The numeral 5 designates a timing means. This timing means may be mechanical or electrical, or both. In the preferred embodiment, however, as shown in Figure 1, it includes a motor 6, which drives a switching mechanism 7. The preferred switching means is shown in detail in Figure 3. To the shaft 37 of motor 6 is attached a cam 36. Riding on the periphery of the cam 36 is a wheel 40 carried by an arm 39 which operates switch 38. Switch 38 is connected in series in a circuit containing a power source 51 and solenoid 19. Arm 39 is made of a resilient material and is an electrical conductor.

As shown, the periphery of cam 36 has two surfaces, 36A and 36B, of different radii. When wheel 40 rides on surface 36A, arm 39 does not touch contact $38^1$ and therefore, solenoid 19 is not energized. When wheel 40 rides on surface 36B, arm 39 does touch contact $38^1$ and, therefore, solenoid 19 is energized. The period of energization and de-energization of solenoid 19 may be adjusted. As will be appreciated by one skilled in the art, power source 51 need not be a battery as shown, but may be any alternating or direct current source, the battery being shown only for exemplary purposes.

In Figure 9, a modified form of timing means provided by this invention is shown wherein cam 36 which effects operation of the switch 38 once per revolution of the cam, is replaced by a cam 136 having a surface designed to effect operation of switch 38 a plurality of times during one revolution of the cam. Of course, by using a cam constructed in accordance with Figure 9, the cam may be driven at less revolutions per minute to effect the same amount of angular displacement of the pulleys as that provided by the cam 38 shown in Figure 3.

Having now set forth hereinabove the general overall construction of motion imparting mechanism of the apparatus, attention will be directed to the constructions operated by the motion imparting mechanism for achieving a dialyzation in accordance with the method of this invention.

According to the method of the invention, a solution is placed in contact with a dialyzing membrane. This membrane may be of various forms including those shown in Figures 4, 5, and 7. The preferred form of membrane is shown in Figure 7 and comprises a flat sheet 100, made of regenerated cellulose, sintered glass, synthetic plastic or any other relatively porous material suitable for dialyzing.

In order to hold a solution in contact with the membrane 100, a containing means, generally designated by the numeral 101 (Fig. 1) is provided. The containing means 101 comprises a hollow cylindrical tube 102, which may be made of glass or any other suitable inert material, and in the preferred construction the membrane 100 serves as the bottom wall of the containing means. As best shown in Figure 7, a ring gasket 103, made of any suitable material such as, for example, rubber, covers the lower edge of the cylinder 102. The gasket 103 prevents cutting of the membrane when in position and held by lip 104 of holding ring 105. The holding ring 105 serves with holding ring 106, bolts 107 and nuts 108 to hold the membrane 100 in position so as to form a container having a bottom wall which is the membrane 100. The holding rings 105 and 106 both have lips 104, an aperture 109 in their centers, and apertures provided through their depth through which bolts 107 pass. When the containing means is put together, membrane 100, gasket 103, tube 102 and rings 104 and 105 are properly positioned, and then nuts 108 are tightened to fixedly secure the parts together. As is apparent, when containing means 101 is assembled in accordance with the above discussion and as shown in Figure 1, there is provided an open top walled container having a membrane as the bottom wall.

Although the preferred form of containing means is presented in Figures 1 and 7, other forms of containing means may be used in accordance with this invention. For example, in Figure 5 is presented a construction wherein tube 102 is replaced by a tube 110, one end of which is bent outwardly to provide a lip 111. Tube 110 as well as tube 102 may be parts of a conventional test tube; tube 102 comprises such a tube having both ends severed therefrom, while tube 110 comprises such a tube having only the bottom closed end severed therefrom.

When the construction presented in Figure 5 is used, a membrane 112 covers one end of tube 110 and is bent around the lip 111. Membrane 112 is secured in position by a gasket 115 and thread 113 which is tightened and tied in position, as by knot 114, over the gasket 115 which is made of any suitable material such as rubber.

Gasket 115 prevents thread 113 from cutting membrane 112. Again, in this instance, a walled containing means is provided having a membrane serving as the bottom wall thereof.

It should be understood that the membrane need not serve as the entire bottom wall of the container, need not be the bottom wall at all, and in fact, the containing means may comprise a tubular membrane such as that shown in Figure 4, in which case the containing means is the membrane 118.

As will be appreciated by one of ordinary skill in the art, it is only necessary that a part of one wall of the containing means be a membrane.

By reference to Figure 6, it will be seen that shaft 33 carries a closure 34, which may be for example, as shown, a cork stopper. The closure 34 is fixedly secured to shaft 33, by any suitable means, such as by gluing. The closure 34 has an aperture 116 through the depth thereof, and as will be apparent hereinafter, this aperture allows for insertion or removal of contents from the containing means as well as pressure equalization within and without the containing means. The closure 34 is suitably designed to engage holding ring 104 if the containing means structure of Figure 7 is used, to engage the open top of tube 110 if the containing means structure of Figure 5 is used, or to engage the open end of the tubular membrane 118 if the containing means structure of Figure 4 is used.

By reference to Figures 1 and 4, it will be seen that a stirring means generally designated by numeral 120 is provided. The stirring means 120 comprises a substantially U-shaped member made of polyethylene, or any other suitable inert material, and has two downwardly depending arms 121 and 122. The end of each arm has a twist or spiral configuration, the twist on one arm being in an opposite direction to that on the other so that when the arms are angularly displaced, one spiral directs fluid outside of, but in contact with, the containing means toward the membrane while the other directs fluid outside of, but in contact with, the containing means away from the membrane. Of course, the stirring means may be the same regardless of type of containing means used, however, it is not necessary that a stirring means of the type described be used or even necessary that a stirring means be provided at all, although most efficient operation is achieved when a stirring means constructed in accordance with the above discussion is incorporated.

The stirring means 120 has an aperture located centrally in the cross-piece connecting arms 121 and 122 through which shaft 33 extends. Pins 123, as shown in Figure 6, may be used to secure the stirring means to the closure 34 so that displacing of shaft 33 will cause displacement of the stirrers and thereby provide stirring as desired. Although, as discussed hereinabove, closure 34 engages the open top of the containing means used, and although the closure may itself support the containing means, it may be desirable to provide further coupling between containing means and the closure, and should such be the case, elastic bands 124 such as those shown in Figure 8 may be passed over the closure 34 and the cross-piece of stirring means 120, and secured to opposite bolts 107. If the containing means of Figures 4 and 5 are used, where no bolts are present, means may be incorporated for securing the bands to opposite walls of the containing means, as is apparent.

By again referring to Figures 1 and 7, it will be noted that when the containing means presented in these figures is used, holding ring 105 blocks vision of the membrane 100, and therefore, so that proper adjustment of the liquid level may be made, leveling pins 125 are secured to holding ring 105. The leveling pins are substantially U-shaped, one free end being disposed in an aperture 126 in ring 105 and held therein by friction, and the free ends being disposed outside of the containing means and level with membrane 100.

In order to perform any dialyzation, it is necessary to have a solution to be dialyzed and a diffusate, one on either side of the dialyzing membrane. To hold the solution on the outer surface of the dialyzing membrane, a container 145 is provided. Container 145 is made of a flexible inert material such as, for example, polyethylene and a band 130 is provided therearound. The band 130 has a threaded aperture therein through which a screw 131 passes. The band and screw are provided so that container 145 may be squeezed such that the level of liquid contained therein is altered. It should be understood that the band-screw arrangement is merely one means which may be used for level adjustment, as various other means may be provided such as, for example, a plunger may be lowered into the liquid in container 145 to cause adjustment of the level of liquid contained therein.

*Operation*

According to the method of this invention, a solution to be dialyzed is placed in contact with one surface of the dialyzing membrane, and the opposed surface of the membrane is covered with a liquid fluid, and the membrane is periodically angularly displaced about an axis perpendicular to the lower surface thereof at a rate which produces shears in the solution and liquid fluid in contact therewith. The shears substantially eliminate the concentration gradients which appear at the membrane surfaces and provide effective stirring of the liquids in contact with the membrane. Although the angular displacement may occur periodically in the same direction, it has been found preferable to cause displacement in opposite directions, that is, to reciprocate the membranes. The amount of angular displacement need only be sufficient to cause a shear in the liquids in contact with the membrane, such amount as is apparent, depending on the rate at which displacement occurs. The method of the invention also provides for stirring the liquid in contact with the outer surface of membrane each time the membrane is displaced, that is, stirring aside from that produced by the shears.

It should be understood that "periodic" as used in this specification and the claims appended hereto, designates action which occurs at substantially regular separated intervals of time.

In carrying out the method of this invention with the apparatus provided thereby, a containing means, having at least a part of one wall thereof as a membrane, such as those discussed hereinabove, is partially filled with the solution to be dialyzed. A vessel of larger cross-section, such as the one designated by numeral 145, is partially filled with a diffusate. The containing means having the membrane wall is inserted in the diffusate contained in vessel 145 and periodically rapidly rotated about its vertical or longitudinal axis. This rotation is at such a rate that a shear is caused in the solution to be dialyzed contained in the containing means.

In using the apparatus of the invention to carry out the method of the invention, the operator would place a partially filled containing means in engagement with closure 34 such that the containing means was closed except for aperture 116 and held in vertical position. The vessel 145 which had been previously partially filled with a solvent would be placed in the position shown in Figure 1. The apparatus would then be connected to a power supply. Shaft 37 of motor 6 would begin to turn and thereby turn cam 36. The cam surface 36A would raise arm 39 thereby causing operation of switch 38 which in turn would cause de-energization of solenoid 19. When solenoid 19 was deactivated, plunger 23, which was held in by the solenoid coil, would rapidly pull into a position where the head $28^1$ of plunger 23 abuts against stop 21 because of the action of spring 27, thereby displacing connecting means 20. As connecting means 20 was displaced, pulleys 12, 13, 14, 15, 16, and 17 would turn, thereby rotating support means 32 and the containing means coupled thereto. The rotation would produce a shear in the liquids on both sides of the membrane. Rotation would stop when plunger 23 reached the limit of inward travel, and the support means and membrane would remain at rest. When cam 36 had rotated to a position where its surface 36B engaged wheel 40 of arm 39 of switch 38, the switch would close. Spring 27 would be stretched and plunger 23 pulled in by the solenoid coil thereby causing displacement of connecting means 20 in the opposite direction. If the spring were sufficiently stiff, there would be a shear produced in the liquids and thus, the supporting means 32 and membrane would be reciprocated and there would be a shear caused on rotation in either direction. However, the spring need not be stiff enough to cause a shear in the liquids in contact therewith. Sufficient stirring would take place if spring 27 were only stiff enough to cause a relatively slow return of connecting means 20 and plunger 23 to their respective original positions. Depending on the stiffness of the spring, the stirring which results from production of a shear may be caused during rotation only in the same direction, or may be caused during rotation in both directions.

When sufficient time had elapsed for proper dialysis, the apparatus would be disconnected from the power supply and the diffusate would be removed in container 145 for any desired further operation.

The operation of the apparatus would be the same if the cam 136 were used instead of cam 36, only the cam 136 would be rotated slower, the times between energization and de-energization of the relay coil depending on the circumferential distances between rises and depressions in the cam surface.

Further stirring than that produced by the shears would be achieved by the stirring arms 121 and 122 which would circulate the liquid fluid in vessel 145 toward and away from the membrane or membranes.

With membranes of low porosity the liquid levels on inside and outside of the membrane are not of particular importance. However, with very porous membranes, it has been found that the levels should be adjusted so that hydrostatic pressures are controlled during dialyzation, and, for this reason, container 145 should be made, at least partially, of flexible material as indicated above. Moreover, although not critical, it has been found that a dwell period of approximately one second between successive angular displacements of the membrane is preferred.

As was pointed out hereinabove, the closure 34 has an opening through the depth thereof, the opening providing access to the contents of the containing means for sampling during a dialyzation test and also providing means to have equal pressures inside of and outside of the containing means.

Although the above discussion has been directed to a dialyzation of one solution, it is apparent that a plurality of dialyzations may be simultaneously run as a plurality of supporting means are provided. At the same time, it should be apparent that the transfer of particles from the solution to be dialyzed to the diffusate may occur in either direction through the membrane, and therefore, if desired, the diffusate may be placed in the containing means and the solution to be dialyzed may be placed in outer container 145.

While the apparatus shown in Figure 1 is the preferred embodiment of this invention, it is to be understood that various modifications other than those specifically referred to hereinabove, can be made without transcending the scope and spirit of the present invention. For example, the vessel 145 may be replaced with a closed vessel adapted for use in the invention, and the diffusate may be circulated through that vessel, or, the apparatus may be adopted to electrodialysis techniques by provision of suitable electrodes.

Since certain changes, as suggested above, may be made in the above apparatus, and since the method may be varied to comply with particular individual requirements, it is intended that all matter contained in the above description or shown in the accompanying drawings shall be interpreted as illustrative and not in a limiting sense.

We claim:

1. A method of dialyzing a solution in contact with a first surface of a membrane, which method comprises covering a second surface of said membrane, opposed to said first surface, with a liquid fluid, and periodically angularly displacing said membrane about an axis substantially perpendicular to the bottom of said membrane at a rate which produces shears in said solution and simultaneously stirring said liquid fluid in contact with said membrane.

2. A method of dialyzing a solution in contact with one surface of a membrane, which method comprises covering a second surface of said membrane, opposed to said first surface, with a liquid fluid, and periodically rotatively reciprocating said membrane about an axis substantially perpendicular to the bottom of said membrane at a rate which produces shears in said solution and said liquid fluid in contact with said membrane.

3. A method of dialyzing a solution in contact with a first surface of a membrane, which method comprises covering a second surface of said membrane, opposed to said first surface, with a liquid fluid, and periodically angularly displacing said membrane less than 360° about an axis substantially perpendicular to the bottom of said membrane at a rate which produces shears in said solution and simultaneously stirring said liquid fluid in contact with said membrane.

4. A method of dialyzing a solution in contact with a first surface of a membrane, which method comprises covering a second surface of said membrane, opposed to said first surface, with a liquid fluid; periodically angularly displacing, first in one direction and then in a direction opposed to said one direction, said membrane less than 360° about an axis substantially perpendicular to the bottom of said membrane at a rate which produces shears in said solution and said liquid fluid in contact with said membrane; and stirring said liquid fluid each time said membrane is angularly displaced.

5. In a dialysis apparatus, the combination of containing means having walls for holding a solution wherein at least a part of one wall of said containing means is a membrane, supporting means for rotatably supporting said containing means, means coupled to said supporting means for stirring a solution outside of, but adjacent said containing means, and means for periodically angularly displacing said supporting means and thereby said means for stirring and said membrane at a rate which produces a shear in a solution in contact with said membrane.

6. In a dialysis apparatus, the combination of containing means having walls for holding a solution wherein at least a part of one wall of said containing means is a membrane, supporting means for rotatably supporting said containing means, and means for periodically angularly displacing, first in one direction and then in the direction opposed to said one direction, said supporting means and thereby said membrane at a rate which produces a shear in a solution in contact with said membrane.

7. In a dialysis apparatus, the combination of containing means having walls for holding a solution wherein at least a part of the bottom wall of said containing means is a membrane, supporting means for rotatably supporting said containing means about an axis substantially perpendicular to the bottom wall of said containing means, stirring means coupled to said supporting means and adapted to stir fluid outside of, but in contact with, said containing means, means for reciprocally rotating said supporting means and thereby said stirring means and said membrane about said axis, and timing means for periodically activating said means for reciprocally rotating said supporting means.

8. An apparatus for use in dialyzing liquid solutions, which apparatus comprises a frame, containing means having walls for holding a solution wherein at least a part of one wall of said containing means is a membrane, supporting means rotatably disposed in said frame for rotatably supporting said containing means, reciprocating means disposed on said frame and coupled to said supporting means for reciprocally rotating said supporting means and thereby said membrane at a rate which produces a shear in a solution in contact with said membrane, and timing means for periodically activating said reciprocating means.

9. An apparatus for use in dialyzing liquid solutions as defined in claim 8 wherein said reciprocating means comprises a rotatable member coupled to said supporting means, connecting means eccentrically attached to said rotatable member, means for displacing said connecting means from an initial position, and means for returning said connecting means to its initial position.

10. An apparatus for use in dialyzing liquid solutions as defined in claim 9 wherein said means for displacing said connecting means from an initial position comprises an electromagnetic solenoid means having a movable member coupled to said connecting means and wherein said means for returning said connecting means to its initial position comprises a resilient member secured at one end to said frame and coupled at its free end to said connecting means.

11. An apparatus for use in dialyzing liquid solutions as defined in claim 9 and further including stirring means comprising arms coupled to said supporting means and disposed outside said containing means to stir fluid outside of, but in contact with, said containing means.

12. An apparatus for use in dialyzing liquid solutions as defined in claim 10 wherein one end of each arm is coupled to said supporting means, and the other end is twisted whereby one of said stirring members directs fluid toward said containing means and the other of said stirring members directs fluid away from said containing means.

13. An apparatus for use in dialyzing liquid solutions as defined in claim 8 wherein said containing means has an open top, wherein said supporting means comprises a shaft having a stopper fixedly secured thereto, said stopper being adapted to engage the open top of said containing means, and wherein said reciprocating means comprises a pulley coupled to said shaft, connecting means engaging the periphery of said pulley, means for displacing said connecting means from an initial position, and means for returning said connecting means to its initial position.

14. An apparatus for use in dialyzing liquid solutions as defined in claim 8 wherein said reciprocating means comprises a rotatable member coupled to said supporting means, connecting means eccentrically attached to said rotatable member, electrically operable means for displacing said connecting means from an initial position, and resilient means for returning said connecting means to its initial position; and wherein said timing means includes a cam, power means for driving said cam and switch means in circuit with said electrically operable means and operated by said cam whereby said switching means effects energization and de-energization of said electrically operable means when said apparatus is coupled to a source of electricity.

15. An apparatus for use in dialyzing liquid solutions, which apparatus comprises a frame, a plurality of containing means, each having walls for holding a solution wherein at least a part of one wall of each of said containing means is a membrane, a plurality of supporting means rotatably disposed in said frame for rotatably supporting said plurality of containing means, a plurality of stirring means coupled to said supporting means for stirring solutions outside of, but adjacent the membranes, reciprocating means disposed on said frame and coupled to said plurality of supporting means for reciprocally rotating said plurality of supporting means and thereby the membranes at a rate which produces a shear in solutions in contact with the membranes, and timing means for periodically actuating said rotating means.

16. An apparatus for use in dialyzing liquid solutions as defined in claim 15, wherein said reciprocating means comprises a plurality of rotatable members, one coupled to each of said plurality of supporting means; connecting means eccentrically attached to each said plurality of rotatable members; unitary means for displacing said connecting means from an initial position, and unitary means for returning said connecting means to its initial position.

17. An apparatus for use in dialyzing liquid solutions, which apparatus comprises a frame having a top member with apertures therein, a bottom member, and a member separating said top and bottom member; a plurality of containing means each having walls for holding a solution wherein at least a part of the bottom wall of said plurality of containing means is a membrane and wherein said plurality of containing means have open tops; a plurality of shafts extending through said apertures in said top member, each of said shafts having a closure fixedly secured thereto below said top member for engaging said open tops of said plurality of containing means and for supporting said containing means; a plurality of rotatable members, one coupled to each of said shafts; connecting means eccentrically coupled to each of said rotatable members; an energizable electromagnetic means having a movable plunger coupled to said connecting means for displacing said connecting means and thereby said rotatable members when said electromagnetic means is energized; a resilient member, one end of which is fixedly secured to said frame and the other end of which is coupled to said connecting means; and timing means comprising a cam, power means to drive said cam, and switching means in circuit with said electromagnetic means and operable by said cam whereby said electromagnetic means is periodically actuated when said power means and said electromagnetic device are electrically connected to a source of electricity.

References Cited in the file of this patent
UNITED STATES PATENTS

| 27,559 | Morgan | Mar. 20, 1860 |
| 489,821 | Leyburn | Jan. 10, 1893 |
| 2,000,021 | Hoffman et al. | May 7, 1935 |
| 2,550,281 | Martin | Apr. 24, 1951 |
| 2,692,854 | Henley | Oct. 26, 1954 |
| 2,734,015 | Wettstein et al. | Feb. 7, 1956 |